2 Sheets—Sheet 1.

W. H. HATFIELD.
Harrows.

No. 196,090. Patented Oct. 16, 1877.

WITNESSES
Saml. R. Zumer
R. H. Lacey

INVENTOR
William H Hatfield
By R.S. & A.P. Lacey
ATTORNEYS

2 Sheets—Sheet 2.

W. H. HATFIELD.
Harrows.

No. 196,090. Patented Oct. 16, 1877.

Witnesses
Sam'l R. Turner
R. H. Lacey

Inventor
William H. Hatfield
By R. S. & A. P. Lacey
ATTORNEY

UNITED STATES PATENT OFFICE.

WILLIAM H. HATFIELD, OF CEDAR GROVE, GEORGIA.

IMPROVEMENT IN HARROWS.

Specification forming part of Letters Patent No. 196,090, dated October 16, 1877; application filed August 10, 1877.

*To all whom it may concern:*

Be it known that I, WILLIAM H. HATFIELD, of Cedar Grove, in the county of Walker and State of Georgia, have invented certain new and useful Improvements in Harrows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to improvements in harrows, the nature of which will be fully explained by reference to the accompanying drawings, in which—

Figure 1:
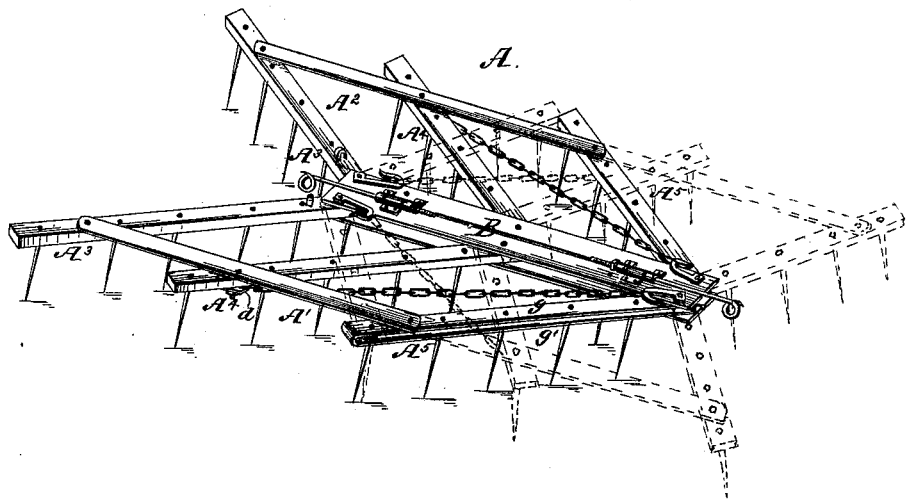
Figure 2:
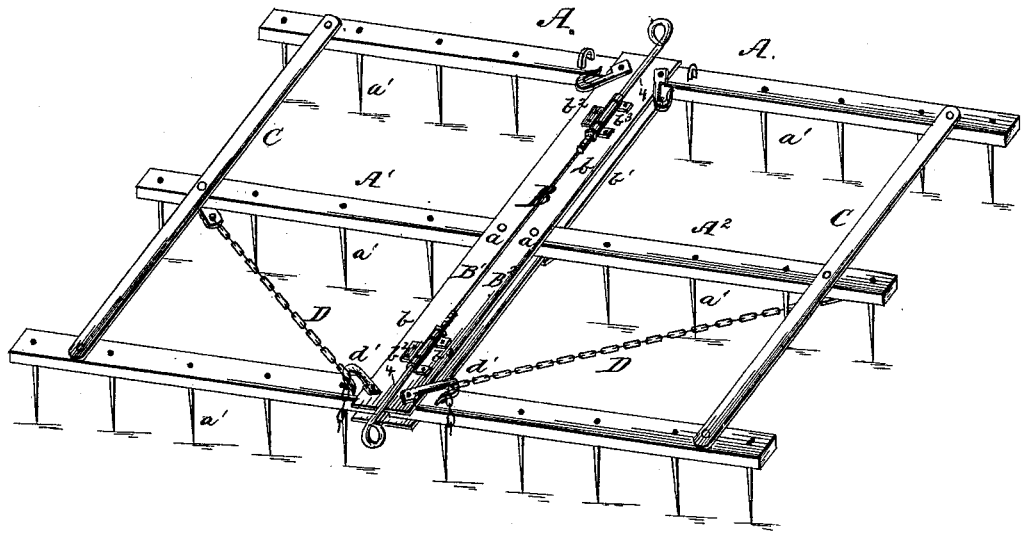
Figure 3:
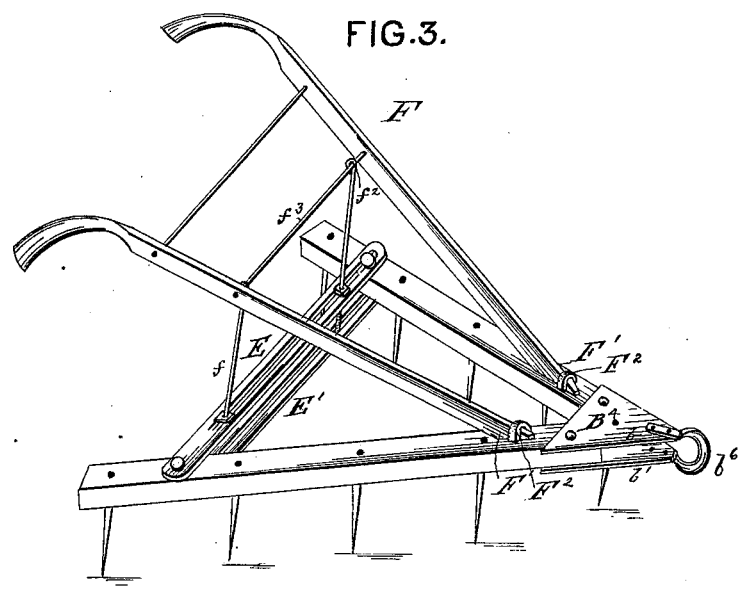
Figure 4:
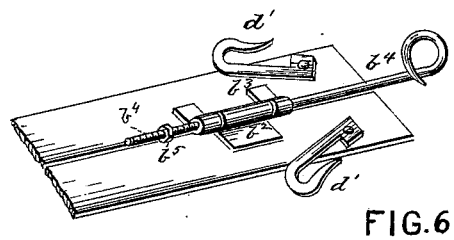
Figure 5:
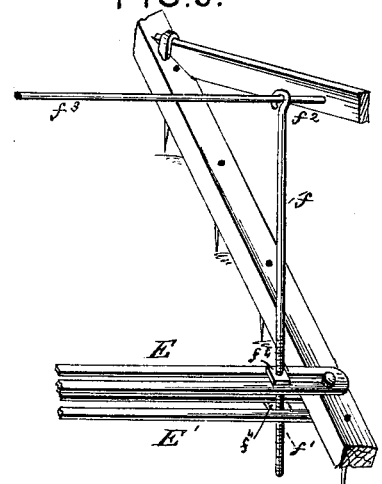
Figure 6:
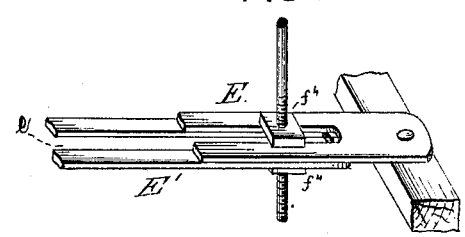

Figures 1 and 2 represent perspective views of a double harrow constructed according to my invention. Fig. 3 represents a perspective view of parts of apparatus represented by Figs. 1 and 2 converted into a single or one-horse harrow; and Figs. 4, 5, and 6 show detail views of parts separately.

In each of the views similar letters of reference are employed to indicate corresponding parts wherever they occur.

A, Figs. 1 and 2, represents a double harrow, each half, $A^1 A^2$, of which is composed of a series of arms, $A^3 A^4 A^5$, which, according to this arrangement, are mounted in sets of three, each arm being pivoted at one end, by means of a pin, $a$, to a central bar, B, which is divided centrally into two halves, $B^1 B^2$, each half, $B^1 B^2$, being composed of two plates, $b\ b^1$, connected together by the pins $a$ and the heads of the harrow-teeth $a'$.

The upper plates $b$ of each half $B^1 B^2$ of the central bar B is provided with half-hinges $b^2 b^3$, (shown more clearly at Fig. 4,) these half-hinges being connected at will by the insertion, and disconnected by the withdrawal, of the bolts $b^4$, which are provided with nuts $b^5$ to prevent accidental removal.

C represents cross-bars for the purpose of connecting together the outer ends of each set of arms $A^3 A^4 A^5$.

D D represent a pair of chains, which, by preference, are connected at one end to the outer ends of the arms $A^4$ by swivel-pieces $d$, while at their opposite ends they are attached to hooks $d'$, carried by the halves $B^1 B^2$ of the center bar B.

By hitching the chains D up shorter on the hooks $d'$, or letting them out, the position or angle of the arms $A^3 A^4 A^5$, and consequently of the harrow-teeth $a'$, may be altered, so as to cause the teeth $a'$ to act in rows nearer to or farther apart, and with the bars and teeth $a'$ at an angle, as shown by dotted and full lines in Fig. 1, or parallel, as shown by Fig. 2.

By having the chains D attached to the reversible fastening $d$ and the hooks $d'$ on the center bar B, the great strain exerted on the tooth-bars of ordinary harrows is in my device obviated, and transferred to the ends of the bar B, and at the point where the power is attached, and in a line with the draft.

In order to form a single harrow, I remove the arms $A^3$ from the center bar B, and apply the same to a shorter bar, $B^4$, by preference formed angular, as shown by Fig. 3, and provided with a draft or hitching loop, $b^6$. The outer ends of the arms $A^3$ are connected by means of the slotted retaining-plates E E', which slide one over the other, and at one end are pivoted to the arms $A^3$, while at their opposite ends they are connected together by means of the lower ends $f^1$ of the standards $f$, which are threaded and provided with the set-nuts $f^4$, as shown, and which pass through the slots $e$, while their upper ends are connected to the handles F by eyes or loops $f^2$, which may be moved to and fro on the cross-bar $f^3$. The handles F, at their front ends $F^1$, are recessed, so as to pass into sockets $F^2$, carried by the arms $A^3$.

By constructing the standards $f$ with threads and set-nuts, as described, the handles F can be raised or lowered, as desired, to adapt them to persons of different heights; and when it is desired to make the single harrow narrower, to adapt it to cultivating between narrow rows of plants, the outer ends of the arms $A^3$ may be drawn to any degree of nearness desired, in which case the loops $f^2$ will slide inward on the cross-bar $f^3$, so as to permit the adaptation of the standards $f$ to the new arrangement.

The arms $A^3 A^4 A^5$ may be constructed of a single strip of metal, bent centrally upon itself, forming an upper and lower plate, $g$ and $g'$, as shown in $A^5$, Fig. 1.

It will be seen that harrow-arms constructed in this way will be stronger than two separate strips joined by a bolt at the end. It will afford a means of fastening the teeth which may be removable by being constructed with a shoulder abutting on the lower bar $g'$, and provided with a thread and nut above the upper bar. The teeth may be made adjustable by having their upper ends threaded and provided with a set-nut between the bars, the set-nut in this construction serving both as a jam and fastening nut.

Having described my invention, what I claim, and desire to secure by Letters Patent, is—

1. In a double harrow, the combination, with the double folding center bar B and the series of hinged or pivoted tooth-bars $A^3 A^4 A^5$, of the hooks $d'$, pivoted on the ends of the halves $B^1 B^2$ of the double center bar B, chains D, and reversible fastening $d$ on one of the intermediate tooth-bars $A^4$, as and for the purpose set forth.

2. The combination, with a pair of removable pivoted arms, $A^3$, having sockets or loops $F^2$, an angular bar, $B^4$, and slotted retaining-plates $E'$ and $E'$, of the handles F, constructed with the cross-bar $f^3$, standards $f$, constructed with the loops $f^2$, and having their lower ends threaded and provided with the set-nuts $f^4$, when arranged and operating substantially as and for the purpose set forth.

3. In a harrow, the double arm or tooth-bar $A^5$, made of a single bar of metal, having its halves $g$ and $g'$ doubled back parallel to each other, so as to leave an intervening space between them, substantially as set forth.

In testimony that I claim the foregoing as my own I affix my signature in presence of two witnesses.

WILLIAM H. HATFIELD.

Witnesses:
 STEPHEN T. STOUT,
 DOCTOR L. STOUT.